April 29, 1969 P. O. WALZ 3,441,243
MOLD FOR PRECAST BUILDING MATERIALS
Filed Oct. 23, 1965 Sheet 1 of 2

INVENTOR
Peter O. WALZ
ATTORNEY

*INVENTOR*
Peter O. WALZ
*ATTORNEY*

United States Patent Office 3,441,243
Patented Apr. 29, 1969

3,441,243
MOLD FOR PRECAST BUILDING MATERIALS
Peter Otto Walz, Montreal, Quebec, Canada, assignor to Rapid Industrial Process Corporation Ltd., Montreal, Quebec, Canada
Filed Oct. 23, 1965, Ser. No. 503,769
Int. Cl. B22d 27/04
U.S. Cl. 249—81                                                   7 Claims

ABSTRACT OF THE DISCLOSURE

A mold for forming concrete panels having a spaced apart outer and inner wall. The space between the walls is partitioned in order to effect distribution of the heat supplied for curing the concrete panel.

---

The present invention relates to the molding of building materials and particularly to an apparatus for molding concrete wherein the curing thereof is accelerated by the application of heat.

Heretofore, molds for concrete and such have been of metal, reinforced concrete or wood. Molds which are made of wood tend to warp; and in order to provide the required shock resistance, they must be heavily constructed. On the other hand, metal molds tend to rust and are otherwise too heavy to be sufficiently portable. Reinforced concrete molds must also be of relatively large construction and they tend to chip.

It has been, furthermore, proposed to include heating elements in the molds for accelerated curing thereof, but these elements were usually embedded in the solid form. Since the molds, such as concrete molds for instance, act as an insulator and much heat is prevented from reaching the liquid concrete. On the other hand, when metal molds are used, the relatively high conductivity of most practical metals allows the mold to be overheated in localized areas, thus presenting an irregular heat pattern.

The aim of the present invention is to provide an improved mold of light weight construction. A further aim is to provide an improved mold for accelerated curing by heating.

The construction of the mold can be defined generally as comprising a shell having at least an inner wall and an exterior wall, the exterior wall being spaced apart from the inner wall in order to provide an air space therebetween, and heating means provided between said walls for heating the air space, whereby equal distribution of heat is provided for the curing of the material to be molded.

In a preferred construction of the mold, it comprises an open-faced trough-shaped shell for receiving the material to be molded, a cover for enclosing said shell, said shell comprising an inner wall and an outer wall spaced apart to form an air space therebetween, said walls being made of reinforced plastic material, the outer wall being adapted to rest on a supporting surface, means between said walls for supporting said inner wall within said outer wall, means provided between said walls for dividing said space into chambers, and heating elements adapted to supply heat to said chambers.

Figure 1:
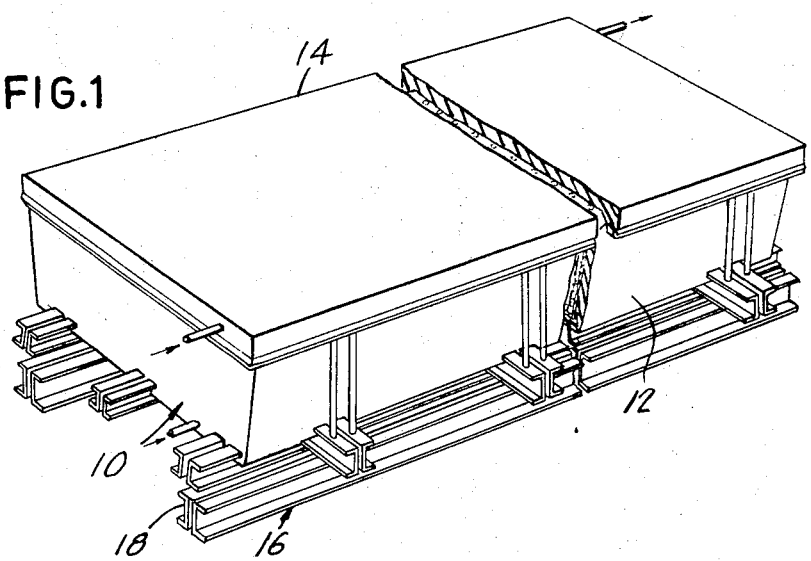
Figure 2:
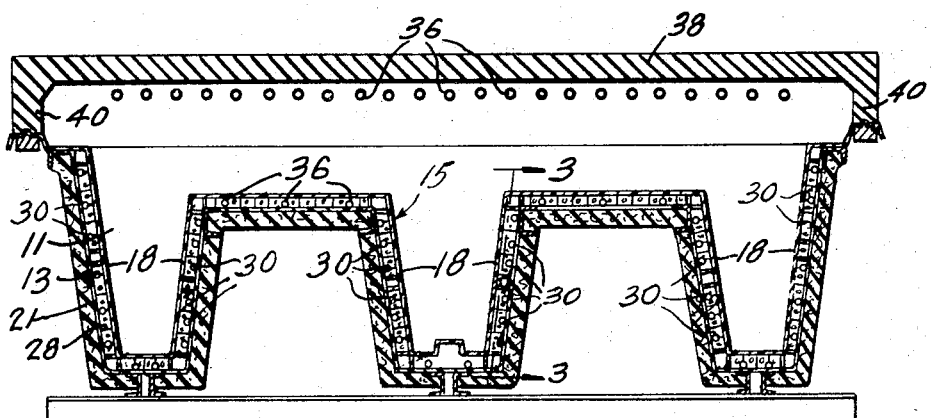
Figure 3:
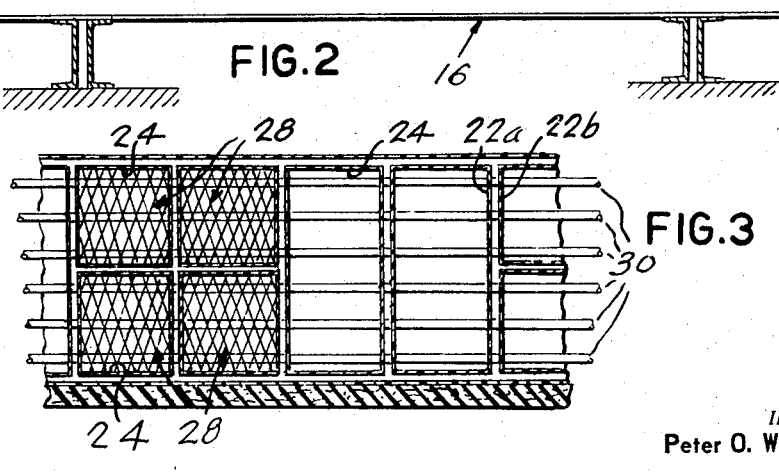
Figure 4:
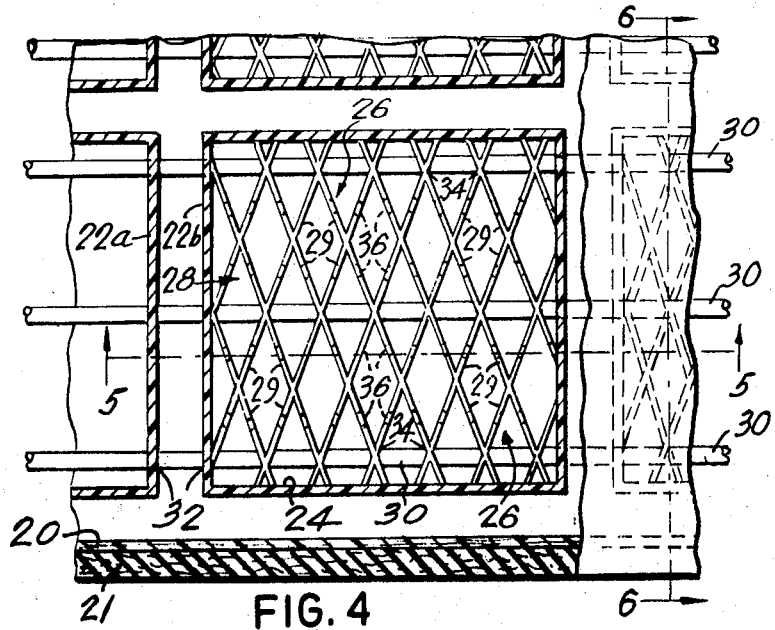
Figure 5:
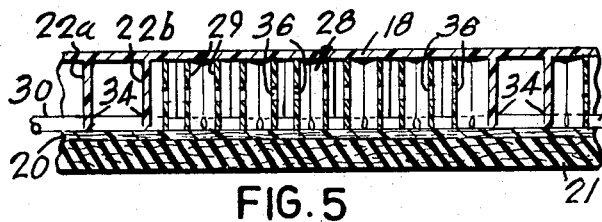
Figure 7:
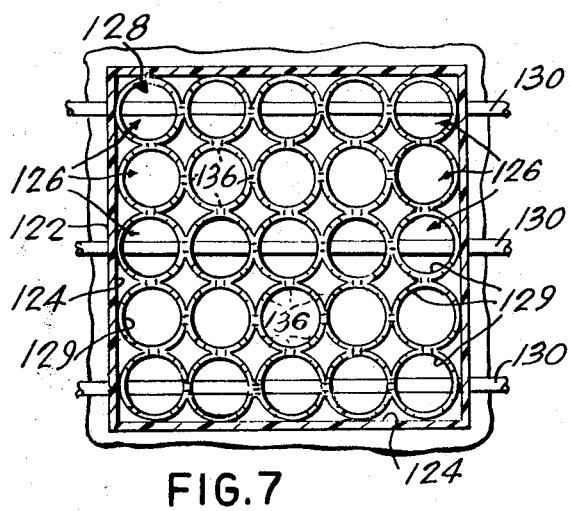
Figure 6:
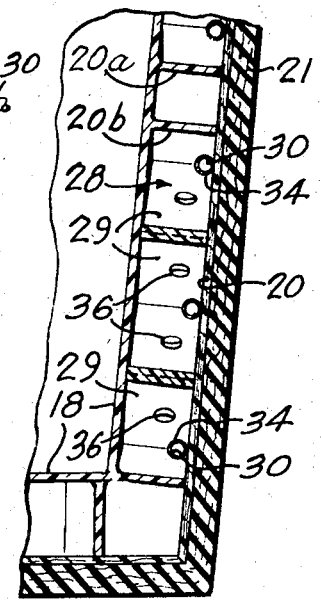

Having thus generally described the nature of the invention, particular reference will be made to the accompanying drawings, showing by way of illustration preferred embodiments thereof and in which:

FIGURE 1 is a perspective view of a mold construction in accordance with the present invention;
FIGURE 2 is a vertical cross section taken along lines 2—2 of FIGURE 1;
FIGURE 3 is a view in cross section taken along line 3—3 of FIGURE 2;
FIGURE 4 is an enlarged partial view showing a detail of FIGURE 3;
FIGURE 5 is a cross sectional view taken along line 5—5 of FIGURE 4;
FIGURE 6 is an enlarged partial view of a detail of FIGURE 2; and
FIGURE 7 is a view similar to FIGURE 4, but showing another embodiment of the construction in accordance with the invention.

Referring now in detail to the drawings and particularly to FIGURE 1, the mold 10 is shown comprising a lower shell 12 and a cover 14. The shell 12 is supported on a conventional base 16.

The lower shell 12 may be made to any predetermined shape so as to suit architectural specifications. Normally, as shown in the embodiment in FIGURE 2, it is trough-shaped and includes a floor 15 and side ledges 13 and comprises an inner wall 18 which is of a reinforced plastic material and preferably of resin bonded glass fiber construction. Spaced apart from the inner wall 18 is a similar outer wall 20 leaving a regular space therebetween. Wall 20 is supported directly on the base 16 and is supplemented by a layer of insulation 21. The inner wall 18 is provided integrally with pairs of companion ribs 22a and 22b. When in an operative position, the wall 18 rests on the wall 20 by means of ribs 22a and 22b.

The ribs 22a and 22b are provided in this case in a rectangular pattern as shown in FIGURE 4. The ribs 22a and 22b provide division walls in the open space between the walls 18 and 20 dividing into rectangular chambers 24. The chambers 24 are further subdivided into partitioned chambers 26 by means of a honeycomb wall structure 28, having wall members 29 which extend the full height between walls 18 and 20.

Heating elements, which may be electrical elements or, as in this case, steam pipes 30, extend longitudinally in a spaced apart parallel relation between walls 18 and 20, through apertures 32 provided in the ribs 22a and 22b and apertures 34 provided in the honeycomb wall members 29. However, the steam pipes 30 do not extend through all the partitioned chambers 26. Therefore, further apertures 36 are provided centrally of the chamber walls 29, communicating each chamber 26 with an adjacent chamber 26. As the air in a partitioned chamber 26 is heated by contact with the pipe 30 which extends through it, the air moves by convection to an adjacent chamber 26 until hot air is equally distributed in all the chambers 26.

The partitioned chambers 26 may be of different shape such as shown in FIGURE 7. In this embodiment the reference numerals corresponding to similar parts in the hereinbefore described embodiment have been raised by 100.

The cover 14 comprises a rectangular web portion 38 having peripheral downwardly extending flanges 40. The cover 14 can also be resin bonded glass fibre material and have the same structure as the shell 12. A series of steam pipes 30 are suspended longitudinally on the interior of the web portion 38 in a spaced apart parallel relation. Conventional clamp members or other devices are provided on the flanges 40 for securing the cover 14 to the side ledges 13.

Ribs 122 form a rectangular chamber 124, but chamber 124 is further subdivided into cylindrical partitioned chamber 126. Steam pipes 130 extend through only certain chambers 126, but the other chambers 126 communicate with each other by means of apertures 136.

It should be understood that more than one layer may be employed to form walls 18 and 20 and that more than one structural combination of walls 18, 20 and wall structure 28 may be employed without departing from the scope of the invention.

In operation, liquid concrete 11 is poured into the lower shell 12 and the cover 14 is clamped to the ledges 13. Steam from a steam source is forced through the steam pipes 30 both in the shell 12 and the cover 14.

As previously explained, the heat is distributed to all the individual communicating partition chambers 26 by convection. Obviously the heat is easily transmitted through the thin wall 18 to the liquid concrete 11 in order to cure it.

The advantages of such a construction is that the mold is light-weight, economical and provides regular heat distribution with relatively minimum loss throughout to the concrete to be cured.

I claim:

1. A mold for molding precast concrete, comprising an open-faced shell, a cover adapted for closing said shell, said shell and cover having similar constructions including a relatively thin inner wall and a relatively thin outer wall having a shape similar to said inner wall, but spaced apart therefrom, said inner wall including a plurality of integral intersecting ribs forming intersecting channels and extending between the walls to support the inner wall in spaced relation from said outer wall, a honeycomb wall structure arranged between the ribs and extending between said inner and outer walls forming cells with the honeycomb walls extending normal between the inner and outer walls, heating elements extending through some of the so-formed cells, said honeycomb walls defining apertures for allowing the air in the heated cells to communicate with the air in the unheated cells.

2. A mold for molding precast concrete, comprising an open-faced trough-shaped shell, a cover adapted for closing said shell, said shell including a relatively thin inner wall and a relatively thin outer wall having a shape similar to said inner wall, but spaced apart therefrom and defining an air space, a honeycomb wall structure arranged between said inner and outer walls forming air filled cells with the honeycomb walls extending fully and normal between the inner and outer walls, heating elements extending through some of the so-formed cells, said honeycomb walls defining apertures for allowing the air in the heated cells to communicate with the air in the unheated cells.

3. A mold as defined in claim 2, wherein said inner and outer walls are made from reinforced plastic.

4. A mold for molding concrete building panels, comprising an open-faced shell formed to the contours of the proposed panel the shell including an inner wall forming the side surfaces and the bottom surfaces of the mold, an outer wall enveloping the inner wall at a constant spacing therefrom and defining an air space therebetween, a plurality of ribs integral with one of the walls forming intersecting channels the ribs supporting the inner wall within the enveloping outer wall, the ribs defining closed air chambers with the inner and outer walls, intersecting partitions extending within the chambers formed by the ribs and forming sub-chambers with the inner and outer walls, heating elements extending within each chamber, the partitions defining apertures whereby the air heated by the elements is communicated to all the sub-chambers within the rib-defined chambers.

5. A mold as defined in claim 4, wherein said shell is made from molded reinforced plastic.

6. A mold for molding concrete building forms as defined in claim 4 wherein the intersecting partitions provided between the walls include deformed chambers of diamond-shaped configuration.

7. A mold for molding building forms, as defined in claim 4 wherein said partitions between said walls for dividing said space into chambers comprises vertically-disposed walls forming cylindrical chambers of a honeycomb pattern.

References Cited

UNITED STATES PATENTS

| | | | |
|---|---|---|---|
| 2,428,660 | 10/1947 | Falk et al. | 249—79 |
| 3,018,087 | 1/1962 | Steele | 165—56 XR |
| 3,124,627 | 3/1964 | Hood | 249—79 XR |

J. SPENCER OVERHOLSER, *Primary Examiner.*